(No Model.)
D. R. COLLIER.
CANOPY SUPPORTING CLAMP.
No. 582,270.　　　　　　　　Patented May 11, 1897.
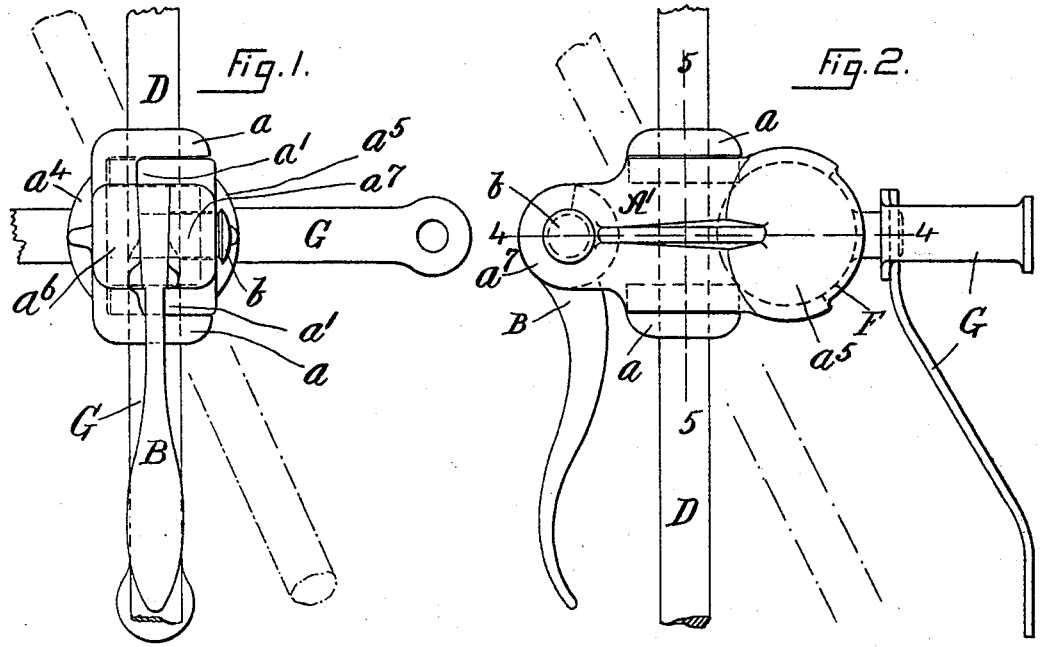
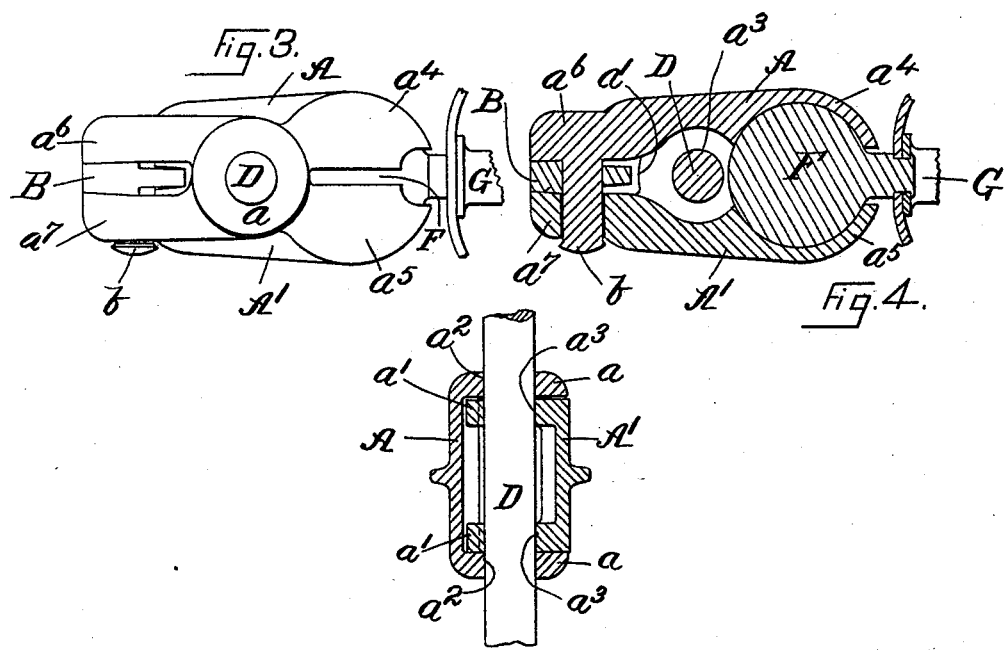
WITNESSES:
H. P. Guillo
John R. Snow
INVENTOR
David R. Collier
BY
Maynadier & Mitchell,
ATTORNEYS.

UNITED STATES PATENT OFFICE.

DAVID R. COLLIER, OF GARDNER, MASSACHUSETTS, ASSIGNOR TO HEYWOOD BROTHERS & CO., OF SAME PLACE.

CANOPY-SUPPORTING CLAMP.

SPECIFICATION forming part of Letters Patent No. 582,270, dated May 11, 1897.

Application filed March 6, 1897. Serial No. 626,277. (No model.)

*To all whom it may concern:*

Be it known that I, DAVID R. COLLIER, of Gardner, in the county of Worcester and State of Massachusetts, have invented a new and useful Clamp, of which the following is a specification, reference being had to the accompanying drawings, in which—

Figure 1 is an elevation of my clamp. Fig. 2 is an elevation of my clamp, taken ninety degrees from Fig. 1. Fig. 3 is a plan of Fig. 1. Fig. 4 is a section on line 4 4 of Fig. 2. Fig. 5 is a section on line 5 5 of Fig. 2.

In the drawings I have shown my clamp made up of the clamping members A A', provided near the middle with the ears $a$ $a'$. The other ends $a^6$ $a^7$ constitute abutments for the distending means, which, as shown, is a cam-lever B on pin $b$, which is preferably fast to A and fits loosely in a hole through the end $a^7$ of member A'. The rod D extends through and fits loosely in the holes $a^2$ $a^3$ in ears $a$ $a'$, and the jaws $a^4$ $a^5$ form sockets which fit the ball F, mounted on tripod G.

The principal use to which my clamp has been put is to support the canopy for baby-carriages, so that the canopy may be readily adjusted and be firmly held in its adjusted position; but obviously any other article which requires to be readily adjusted and firmly held may be secured to rod D.

The tripod G is secured to the baby-carriage or any other support, and the clamping-jaws $a^4$ $a^5$ may be readily adjusted with relation to ball F, and I use a ball F and make the jaws $a^4$ $a^5$ as sockets in order to get certain adjustments and slide rod D through the ears $a$ $a'$ to complete the desired adjustment.

After the adjustment of members A A' relatively to rod D and ball F is made the cam-lever B is moved, and thereby the ears $a$ $a'$ firmly clamp rod D, while the jaws $a^4$ $a^5$ firmly clamp ball F, and this is the distinguishing feature of my invention, for obviously the article may be mounted on ball F and rod D be mounted on the fixed support, the new result being that when the ends $a^6 a^7$ of the members A A' are not forced apart rod D and ball F are both readily adjustable relatively to members A A', while when those ends $a^6$ $a^7$ are forced apart both rod D and ball F are firmly clamped. The best form of distending means is the cam-lever B and pin $b$, fast to one member A and headed, as shown, to keep the members A A' in place when rod D is withdrawn from the ears $a$ $a'$; but obviously other distending means will answer.

When ball F is secured, as by tripod G or otherwise, to the fixed support, the article to be adjusted is carried by rod D; but when rod D is secured to the fixed support the article to be adjusted is carried by ball F.

What I claim as my invention is—

1. The double clamp above described, made up of members A A', provided with clamping-ears $a$ $a'$ near the middle and clamping-jaws $a^4$ $a^5$ at one end; rod D extending through ears $a$ $a'$; ball F between jaws $a^4 a^5$; and distending means between the ends $a^6$ $a^7$; all combined to admit of free motion of members A A' with relation to rod D and also with relation to ball F when the ends $a^6$ $a^7$ are not forced apart, but to clamp all the parts firmly when the ends $a^6$ $a^7$ are forced apart by the distending means; substantially as set forth.

2. In combination ball F; means, as tripod G, for securing ball F to a fixed support; clamp members A A' provided with sockets $a^4$ $a^5$ for ball F, and with ears $a$ $a'$ for rod D; rod D extending through ears $a$ $a'$ and movable endwise therein; and distending means between the ends $a^6$ $a^7$ of members A A', substantially as described.

DAVID R. COLLIER.

Witnesses:
 THATCHER B. DUNN,
 FLORENCE L. MOORE.